US008045864B2

United States Patent
Ann et al.

(10) Patent No.: US 8,045,864 B2
(45) Date of Patent: Oct. 25, 2011

(54) METHOD AND APPARATUS FOR PROCESSING SIGNALS OF PHOTO-DETECTOR IN VISIBLE LIGHT COMMUNICATION SYSTEM

(75) Inventors: Jong-Hoon Ann, Suwon-si (KR); Jae-Seung Son, Suwon-si (KR); Eun-Tae Won, Yangcheon-gu (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 694 days.

(21) Appl. No.: 12/189,364

(22) Filed: Aug. 11, 2008

(65) Prior Publication Data
US 2009/0041476 A1    Feb. 12, 2009

(30) Foreign Application Priority Data
Aug. 10, 2007 (KR) .......................... 10-2007-0080638

(51) Int. Cl.
*H04B 10/00* (2006.01)
*H04B 10/06* (2006.01)

(52) U.S. Cl. .......................... 398/202; 398/208; 398/172

(58) Field of Classification Search .................. 398/172, 398/202–204, 208–211
See application file for complete search history.

(56) References Cited

U.S. PATENT DOCUMENTS

| | | | | |
|---|---|---|---|---|
| 5,635,700 A | * | 6/1997 | Fazekas | ................... 235/462.06 |
| 5,953,146 A | * | 9/1999 | Shelby | ........................... 398/131 |
| 2005/0046482 A1 | * | 3/2005 | Schrodinger | ................. 330/308 |

* cited by examiner

*Primary Examiner* — Dalzid Singh
(74) *Attorney, Agent, or Firm* — Cha & Reiter, LLC

(57) ABSTRACT

Disclosed is a method for processing incoming signals of photo-detectors in a visible light communication system. The method includes: dividing symbol duration into divided durations according to an equal time interval to set the divided durations to a plurality of time slots, the symbol duration being a time required to transmit one of a symbol and a bit; receiving visible light signals through a photodiode array in a receiver; determining a gain value of each of the photodiodes during a time slot, in consideration of each photodiode area on the photodiode array during the time slot and the time slot position within the symbol duration; multiplying a gain value of each of the photodiodes by an output value of a corresponding photodiode; and summing up output values of each of the photodiodes by which the gain value has been multiplied and calculating a total of output values of the time slot.

16 Claims, 7 Drawing Sheets

METHOD AND APPARATUS FOR PROCESSING SIGNALS OF PHOTO-DETECTOR IN VISIBLE LIGHT COMMUNICATION SYSTEM

CLAIM OF PRIORITY

This application claims the benefit under 35 U.S.C. §119 (a) of an application entitled "Method and Apparatus For Processing Signals Of Photo-Detector In Visible Light Communication System" filed in the Korean Intellectual Property Office on Aug. 10, 2007 and assigned Ser. No. 2007-80638, the entire contents of which are hereby incorporated by reference.

BACKGROUND OF THE INVENTION

1. Field of the Invention

The present invention relates to a visible light communication system, and more particularly, to a method and an apparatus for processing incoming signals in a visible light communication receiver using a plurality of photo-detectors.

2. Description of the Related Art

Recently, with improvement in the luminance efficiency of Light Emitting Diodes (LEDs) and a price drop of the LEDs, the use of LEDs has widely spread in general lighting markets, including the markets of fluorescent lamps and incandescent lamps, as well as specific lighting markets, including the markets of portable devices, displays, automobiles, traffic lights, billboards, etc.

Recently, various factors (e.g., the exhaustion of radio frequency (RF) band frequencies, potential crosstalk between several wireless communication technologies, an increasing demand for communication security, and the advent of an ultra-high speed ubiquitous communication environment based on 4G wireless technologies) have increased interest in radio over fiber technologies complementary to RF technologies. Consequently, research on visible light wireless communication employing visible light LEDs is now in progress by many enterprises and laboratories.

Fluorescent lamps and incandescent lamps currently being used for lighting in homes, offices, and public places are expected to be replaced by LEDs having higher performance and longer life. If current applied to an LED used for lighting is modulated, the LED for lighting can be utilized as a light source for communication. That is, it is possible to provide broadcasting and data transmission only through an LED for lighting without adding a light source.

As such, visible light communication for transferring information by using visible light has advantages in that it is possible to freely perform communication through widely available bandwidth without regulation, as compared with radio communication, and it is also possible to provide reliability in view of security, as well as identification of communication links. Further, in visible light communication, it is possible to simultaneously perform a communication function and a lighting function. That is, by using a general illuminator, it is possible to act as a visible communication transceiver for transmitting and receiving information simultaneously while acting as lighting.

FIGS. 1A and 1B are views schematically illustrating a visible light receiving unit of a conventional visible light communication receiver. FIG. 1A is a view schematically illustrating a visible light receiving unit using one photodiode (PD) as a photo-detector in the conventional visible light communication receiver. Referring to FIG. 1A, the visible light receiving unit of the visible light communication receiver includes a photodiode 100 for photo electrically converting received light into electrical signals, and a lens 120 for concentrating the received light to the photodiode 100. The visible light signals transmitted from a transmitter are received into a receiver, and the received visible light signals are concentrated to the photodiode 100 through the lens 120. Then, the visible light signals are converted into electrical signals by the photodiode 100 before a reception operation is performed.

FIG. 1B is a view schematically illustrating a visible light receiving unit using a plurality of photodiodes as a photo-detector in the conventional visible light communication receiver. FIG. 1B is a view illustrating a visible light receiving unit using a photodiode array with a plurality of photodiodes in a visible light communication receiver. The visible light receiving unit of the visible light communication receiver shown in FIG. 1B includes a plurality of photodiodes 131 to 139 for photo electrically converting received light into electrical signals, and a lens 140 for concentrating the received light to the photodiode array (hereinafter, referred to as "PD array"). When the PD array including the photodiodes 131 to 139 is used, a visible light which pass through the lens are received at one photodiode or a plurality of photodiodes, depending on a light-receiving angle of the visible light. The visible light communication receiver performs a function of restoring incoming signals through electrical signals output from a photodiode at which the light has been received.

The reason why a plurality of photodiodes is used in the visible light communication receiver is that there is a relationship between a size of a photodiode area and reaction speed. In general, an increase in the photodiode area increases a corresponding light-receiving amount, but reduces the operation speed of the photodiode. In addition, resistance is increased as the photodiode area gets larger, so that the increased resistance in a circuit increases a time constant. Therefore, since the width of the photodiode is in inverse proportion to the operation speed of the photodiode, if a plurality of photodiodes with small areas are disposed to have an array configuration, it is possible to anticipate the extension of the light-receiving area together with the improvement of the operation speed.

FIG. 2 is a block diagram schematically illustrating the conventional visible light communication receiver using a plurality of photodiode as a photo-detector. The conventional visible light communication receiver using a plurality of photodiodes includes a PD array 250 which includes a plurality of photodiodes 200-1 to 200-n that photo electrically converts received light into electrical signals, a summer 210 for summing up the converted electrical signals, a demodulator 220 for demodulating incoming signals, and a decoder 230 for correcting errors by an error correction code.

The visible light signals received by the visible light communication receiver is photo electrically converted by the photodiodes 200-1 to 200-n, and then output values of each of the photodiodes 200-1 to 200-n are summed up by the summer 210.

FIG. 3 is a flowchart illustrating a reception operation of the conventional visible light communication receiver using a plurality of photodiodes as a photo-detector. The reception operation of the conventional visible light communication receiver will be described with reference to FIG. 3. In step 310, the visible light communication receiver receives visible light signals from a visible light communication transmitter. In step 320, the visible light signals are received at the PD array 250 of the visible light communication receiver, and then output values of each of the photodiodes on the PD array 250 are summed up by the summer 210. In step 330, the visible light communication receiver demodulates the summed-up signals. In step 340, the visible light communication receiver performs a decoding operation. In step 350, it is determined if the reception operation is terminated. As a result of the determination in step 350, when the reception operation is not terminated, the process returns to step 310, in which the reception operation is repeatedly performed. Otherwise, the reception operation is terminated.

Meanwhile, the visible light communication using a free space propagation scheme operates in an environment different from that of the optical communication scheme using optical fibers. In the optical communication scheme, signals are transferred using optical fibers, so that transmitted signals are received by a receiver almost without loss. However, in the visible light communication using a free space propagation scheme, visible light signals with information illuminates wide free space during transmission, so that the visible light communication receiver receives only a part of signals transmitted from the visible light communication transmitter. To solve this problem, the visible light communication receiver employs additional components, such as a lens, for increasing the light-receiving amount.

Further, as described in FIGS. 1 and 2, a scheme for disposing a plurality of photo-detectors in an array configuration may be employed, in order to improve the performance of the receiver in the visible light communication. In this case, it is possible to anticipate extension of the whole light-receiving area together with improvement of operation speed. In the case of using the above-described scheme, an area of each of the photo-detectors constituting a photo-detector array is in inverse proportion to operation speed. Therefore, as the area of the photo-detector gets larger, the amount of receivable light increases, which increases strengths of output electrical signals while decreasing the reaction speed of the detector. In other words, when the speed of change of the transmitted light by increase of the transmission speed is beyond the operation limit of the photo-detectors, the normal reception operation may not be performed. To overcome the above-described problem, there has been proposed a scheme of using an array including photo-detectors with small areas. However, in this case, an increase in complexity relatively increases cost.

Therefore, a method for restoring visible light signals with reliability is needed.

SUMMARY OF THE INVENTION

Accordingly, the present invention provides a method and an apparatus for processing signals in a visible light communication system, which can restore incoming signals with reliability by combining output signals of a plurality of photodiodes having different areas from one another.

In accordance with an aspect of the present invention, there is provided a method for processing incoming signals of a plurality of photo-detectors in a visible light communication system, the method including the steps of: dividing symbol duration according to an equal time interval to set each of the divided durations to a plurality of sequential time slots, the symbol duration being a time required to transmit a symbol or a bit; receiving visible light signals through a plurality of photodiodes arranged as an array in a receiver; determining a gain value of each photodiode of said plurality during a time slot, in consideration of each photodiode area on the photodiode array during the time slot and a time slot position within the symbol duration; multiplying a gain value of each photodiode of said plurality by an output value of a corresponding photodiode; and summing up the multiplied output values of each photodiode as a total output value of the time slot.

Preferably, the method further comprises a step of summing up all the multiplied output values of each of the time slots constituting the symbol duration and calculating a total output value of the symbol duration.

Preferably, the photodiode array includes a plurality of photodiodes having a plurality of different areas, which are arranged in a plane, and each of the photodiodes independently operates.

Preferably, in determining the gain value, a gain value larger than that of a photodiode with a larger area is allocated to a photodiode with a smaller area in a time slot expected to have greater variation of incoming signals than other time slots within the symbol duration, and a gain value larger than that of a photodiode with a smaller area is allocated to a photodiode with a larger area in a time slot expected to have no variation of incoming signals.

In accordance with another aspect of the present invention, there is provided a receiving apparatus for processing incoming signals of photo-detectors in a visible light communication system, the apparatus including: a photodiode array comprising a plurality of photodiodes for converting received optical signals into electrical signals; a gain controller for dividing symbol duration according to an equal time interval to set the divided durations to a plurality of sequential time slots, the symbol duration being a time required to transmit one symbol or a bit, and for determining a gain value of each photodiode of said plurality during the time slot in consideration of an area of each photodiode on the photodiode array during the time slot and a time slot position within the symbol duration; a multiplier for multiplying the gain value determined in the gain controller by an output value of a corresponding photodiode; and a summer for summing up an output value of each photodiode of the photodiode array by which the gain value has been multiplied and calculating a total of output values of the time slot.

Preferably, the summer sums up the total of output values of each of the time slots constituting the symbol duration and calculates a total output value of the symbol duration.

Preferably, the photodiode array includes a plurality of photodiodes having a plurality of different areas, which are arranged in a plane, and each of the photodiodes independently operates.

Preferably, the gain controller allocates a gain value larger than that of a photodiode with a larger area to a photodiode with a smaller area in a time slot expected to have a greater variation of incoming signals than other time slots within the symbol duration, and the gain controller allocates a gain value larger than that of a photodiode with a smaller area to a photodiode with a larger area in a time slot expected to have no variation of incoming signals.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Hereinafter, an apparatus and an operation method for exemplary embodiments of the present invention will be described with reference to the accompanying drawings.

The present invention provides a method for applying a suitable gain value to a photodiode array including a plurality of photodiodes, so as to restore necessary visible light signals during reception of visible light signals.

Hereinafter, a method and an apparatus for processing signals of photo-detectors in a visible light communication system according to one embodiment of the present invention will be described in more detail with reference to the following drawings.

Figure 1B:
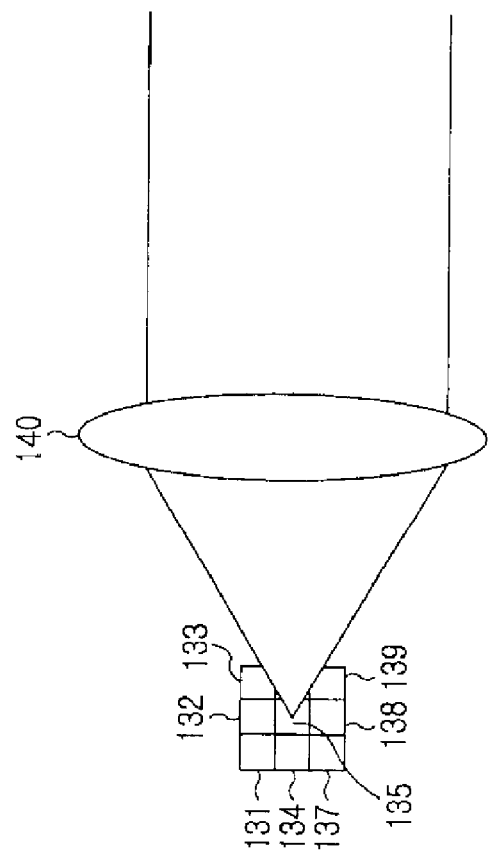
FIGS. 1A and 1B are views schematically illustrating a visible light receiving unit of a conventional visible light communication receiver.
Figure 1A:
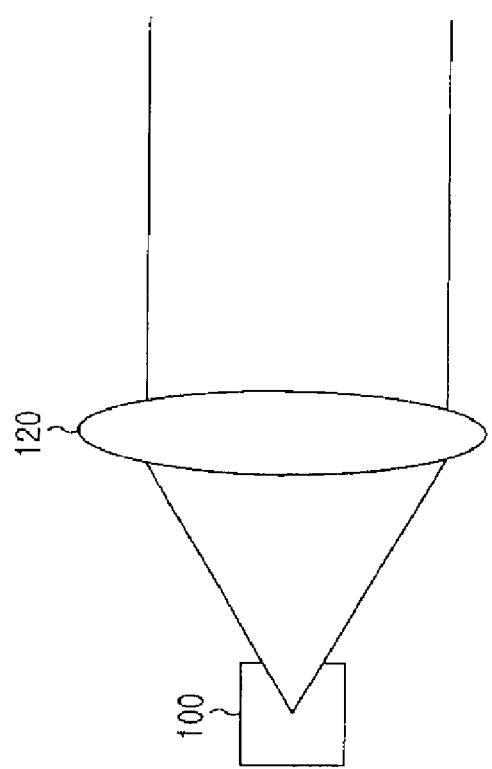
Figure 2:
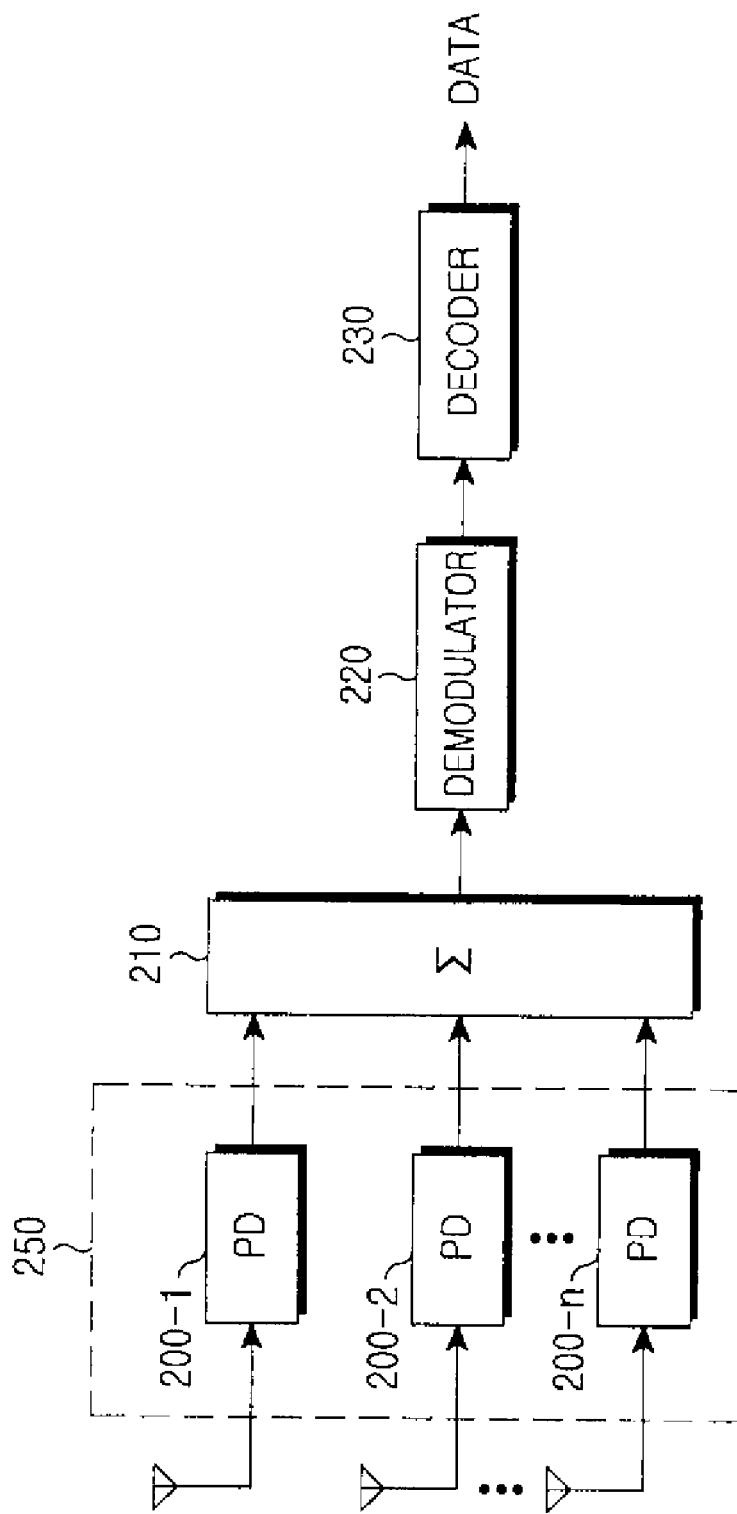
FIG. 2 is a block diagram schematically illustrating the conventional visible light communication receiver using a plurality of photodiodes as a photo-detector.
Figure 3:
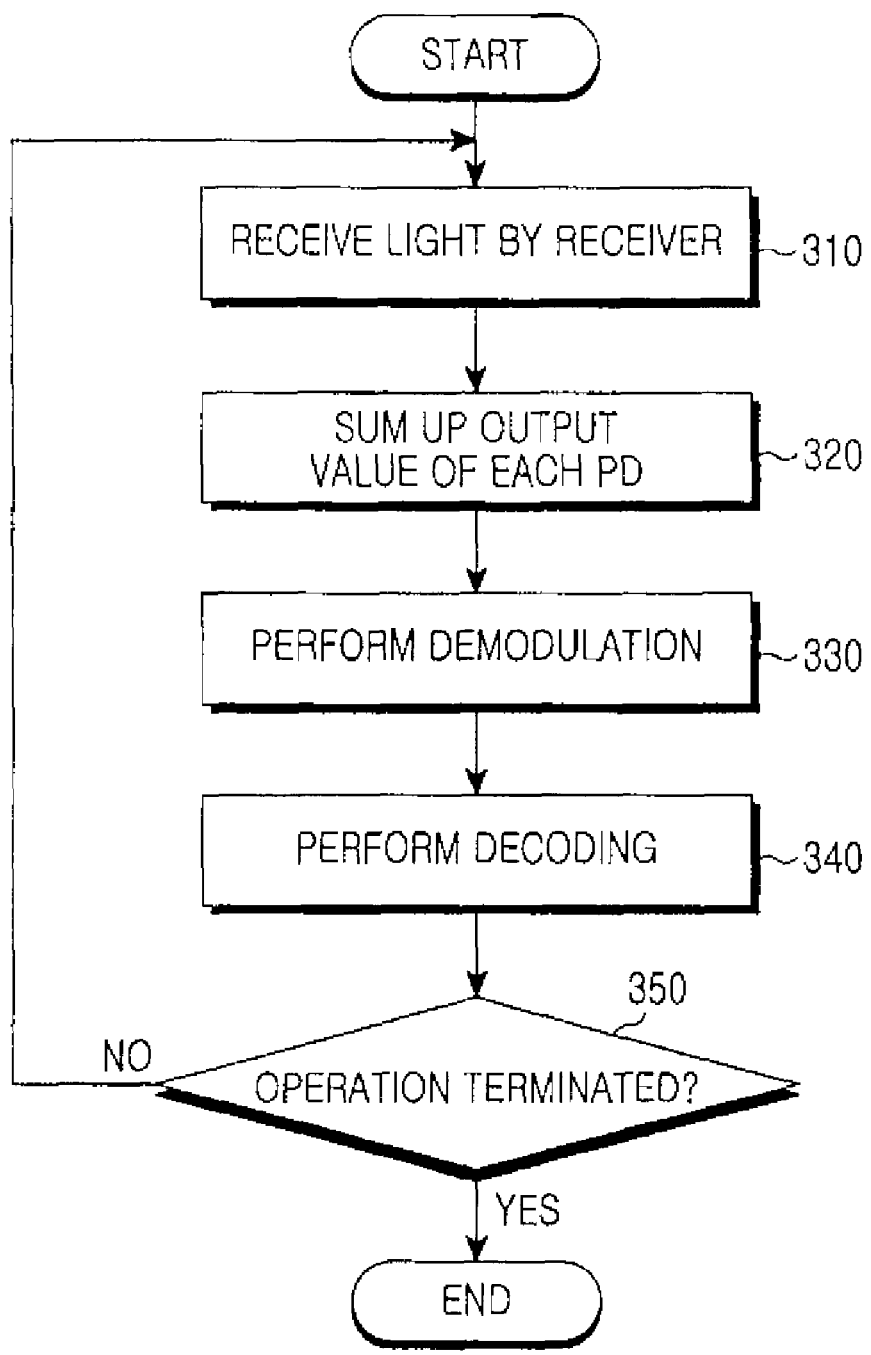
FIG. 3 is a flowchart illustrating a reception operation of the conventional visible light communication receiver using a plurality of photodiodes as a photo-detector.
Figures 4A, 4B:
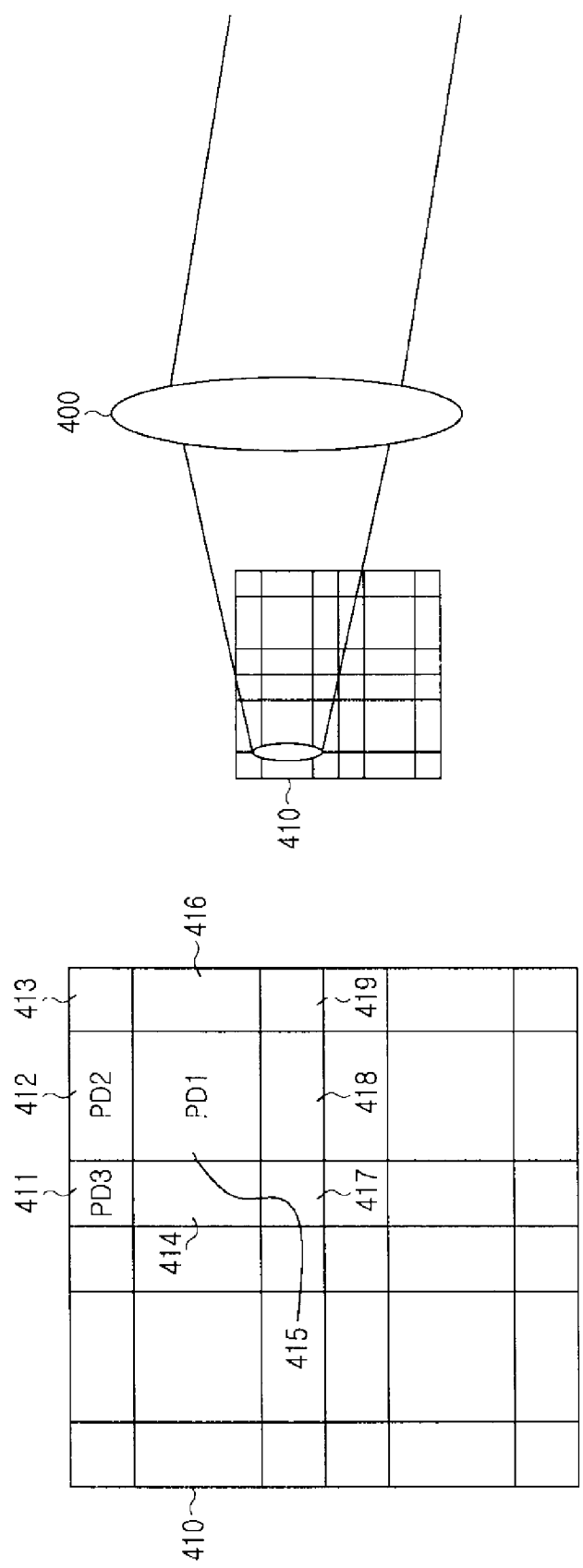
FIGS. 4A and 4B are views schematically illustrating a visible light receiving unit of the visible light communication receiver according to one embodiment of the present invention.

FIGS. 4A and 4B are views schematically illustrating a visible light receiving unit of the visible light communication receiver according to an exemplary embodiment of the present invention.

FIG. 4A shows a photodiode array 410 (hereinafter, referred to as "PD array") including a plurality of photodiodes having a plurality of different areas. The PD array 410 includes a plurality of photodiodes 411 to 419 having a plurality of different areas, each photodiode of which plurality independently operates. For example, referring to FIG. 4A, the PD1 415 has a large area, so that the PD1 415 has a large light-receiving amount and gets higher output signals, but has relatively low reaction speed. The PD3 411 has a relatively small area, so that the PD3 411 has a small light-receiving amount, but has a high reaction speed. Further, a PD2 412 has a smaller area than that of the PD1 415, but has a larger area than that of the PD3 411, so that the PD2 412 has a characteristic corresponding to a middle operational range of the PD1 415 and the PD3 411. Therefore, the PD array includes photodiodes having a plurality of different areas disposed in an array according to the present invention, so that it is possible to implement rapid reaction speed through use of a photodiode with a small area, and it is also possible to obtain a large light-receiving amount through use of a photodiode with a large area.

FIG. 4B is a view illustrating a visible light receiving unit using a PD array with a plurality of photodiodes in a visible light communication receiver. The visible light receiving unit of the visible light communication receiver shown in FIG. 4B includes a PD array 410 for photo electrically converting received light into electrical signals, and a lens 400 for concentrating the received light to the PD array 410.

FIG. 4B shows a situation in which light received by the visible light receiving unit is incident through a side of the lens 400. In this case, the received light may be received at least one photodiode of a plurality of photodiodes according to a light-receiving angle. Further, according to the present invention, when light is received at a plurality of photodiodes, the PD array is constructed by disposing a plurality of photodiodes having a plurality of different areas so that light can be received at the plurality of photodiodes. The visible light receiver restores received data through electrical signals output from at least one photodiode of the plurality of photodiodes at which the light has been received.

Figure 5:
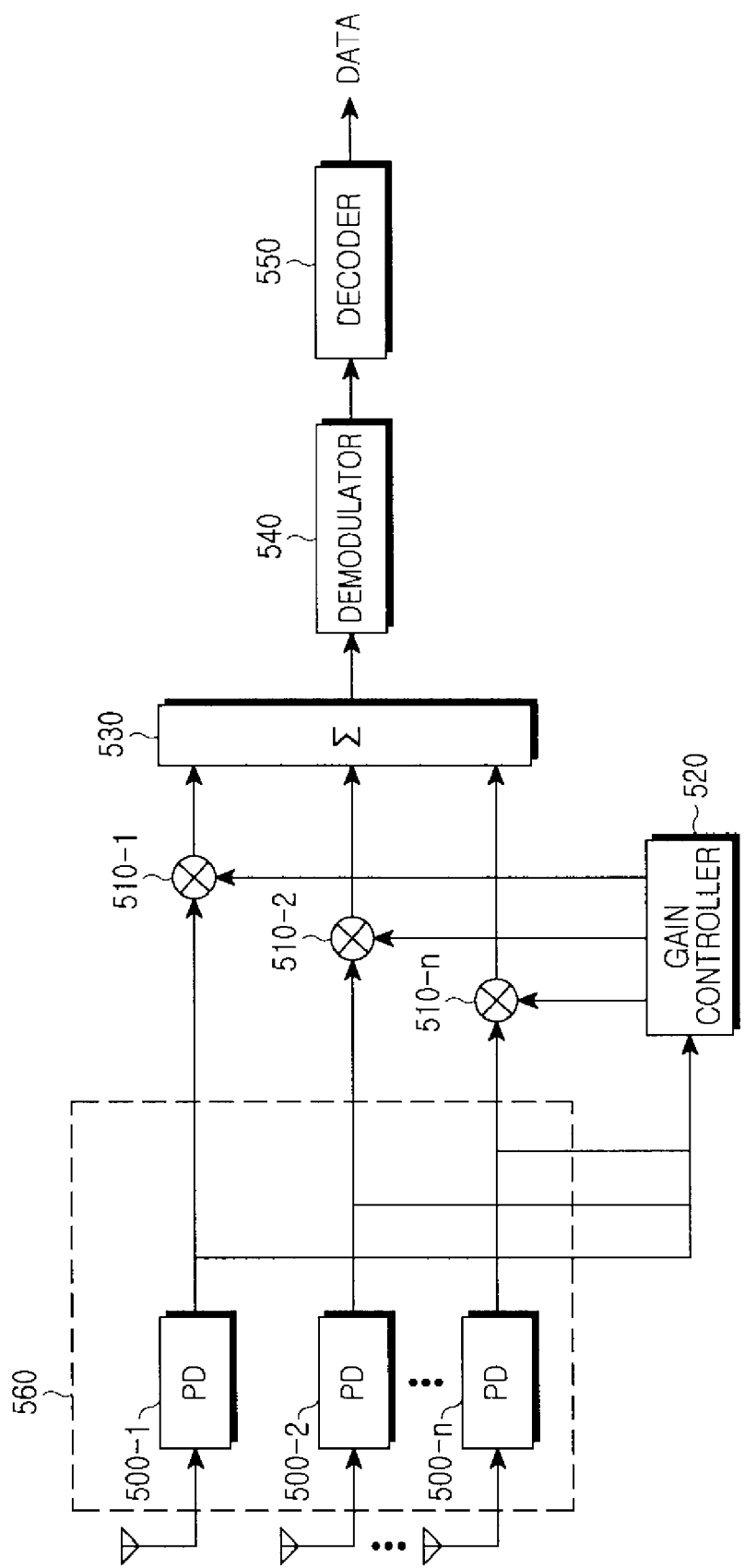
FIG. 5 is a block diagram illustrating a visible light communication receiver according to one embodiment of the present invention.

FIG. 5 is a block diagram illustrating a visible light communication receiver according to an exemplary embodiment of the present invention. Referring to FIG. 5, the visible light communication receiver according to this exemplary embodiment of the present invention includes a plurality of photodiodes 500-1 to 500-n for photo electrically converting received light into electrical signals; a gain controller 520 for determining gain values of output values for each of the photodiodes 500-1 to 500-n; a plurality of multipliers 510-1 to 510-n for multiplying a gain value, calculated by the gain controller 520, by output signals of corresponding photodiodes 500-1 to 500-n; a summer 530 for summing up output values of each of the photodiodes 500-1 to 500-n to which the gain values calculated by each of the multipliers 510-1 to 510-n have been applied; a demodulator 540 for demodulating the summed-up signals; and a decoder 550 for decoding the demodulated signals.

Referring to the construction of the visible light communication receiver according to this exemplary embodiment of the present invention, a method for determining a gain value of a photo-detector on receiving visible light signals will be described. Visible light signals received at the photodiode 500-1 to 500-n are photo electrically converted into electrical signals, and then the converted electrical signals are output. Then, the gain controller 520 calculates gain values which are to be applied to output values of each photodiode 500-1 to 500-n.

Referring to FIGS. 4A and 4B, a method for calculating gain values will be described, taking an example of an operable method.

Light collected by the lens 400 is concentrated on specific photodiodes of the photodiodes comprising the PD array 410. For example, when it is assumed that a lens focus is concentrated on the PD1 415, the PD2 412, and the PD3 411, corresponding to the specific photodiodes, in the method for determining gain values of the photo-detectors according to the present invention, a gain value for each of the photodiodes is determined in consideration of characteristics of a corresponding time interval during signal restoration and each photodiode area. Hereinafter, the reception operation will be described in more detail with reference to FIG. 7.

Figure 7:
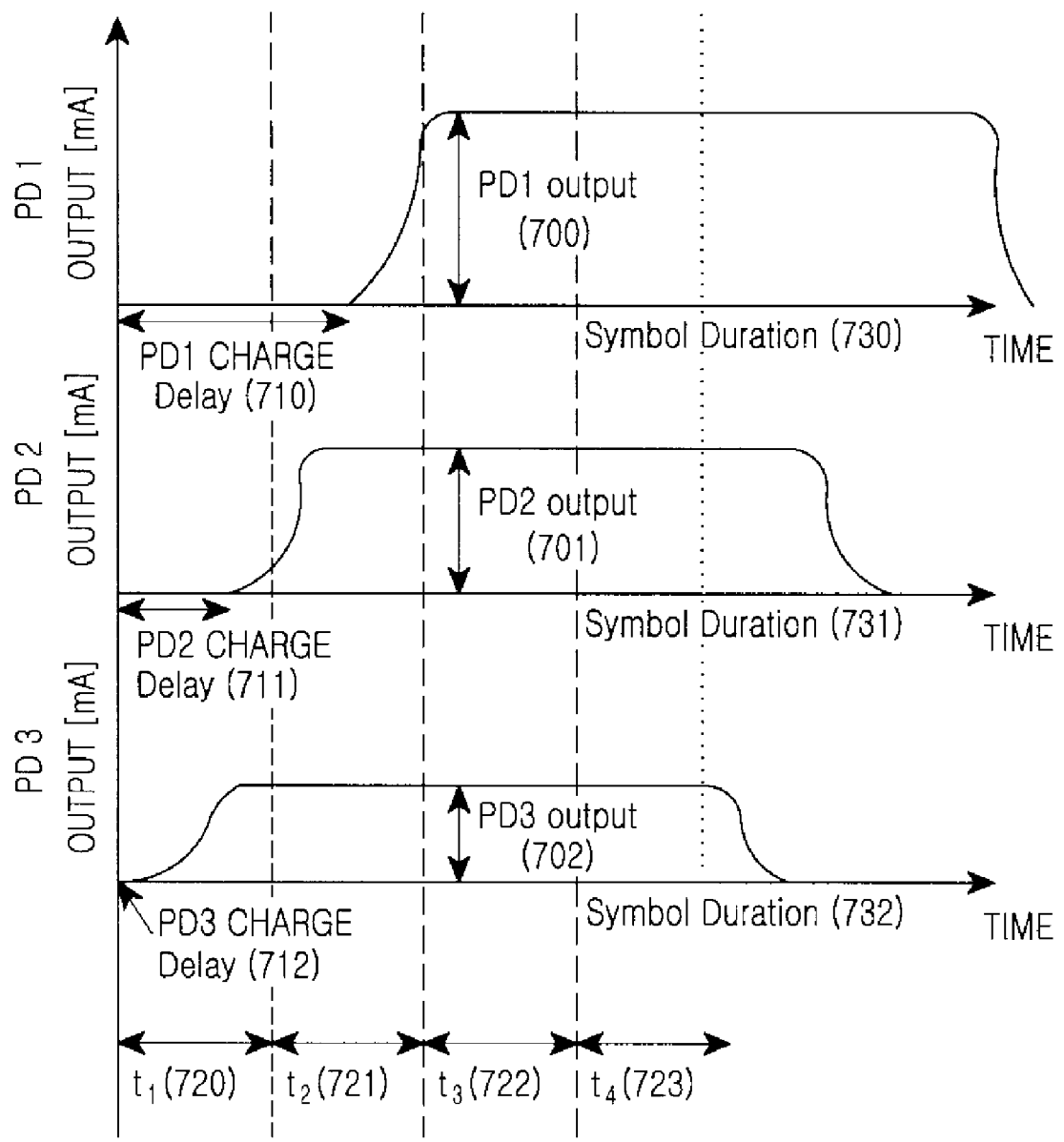
FIG. 7 is a waveform view illustrating output values depending on time of respective photodiodes during a reception operation of visible light communication according to one embodiment of the present invention.

FIG. 7 is a waveform view illustrating output values of each of the photodiodes based on time during a reception operation of visible light communication, according to an exemplary embodiment of the present invention. Referring to FIG. 7, each of the photodiodes has a different area, and thus light-receiving amount is different for each photodiode. Therefore, electrical signals output from each of the photodiodes have mutually different levels.

As shown in FIG. 4A, since the PD1 415 has the largest area out of the PD1 415, the PD2 412, and the PD3 411, it takes the longest time for the PD1 415 to be charged, which causes the longest charge delay 710. Further, since the PD2 412 and the PD3 411 also have mutually different areas, there is a difference between the charge delay 711 of the PD2 412 and the charge delay 712 of the PD3 411.

Symbol durations 730 to 732 refer to time required to transmit one symbol or a bit. According to the present invention, the symbol duration is divided into at least one sequential time slot each time slot having a predetermined time interval. For example, if one symbol duration is divided into four, one symbol duration may include four time slots such as t1 to t4 720 to 723. Then, the output 702 of the PD3 is the largest among them during time slot t1 720, the output 701 of the PD2 is the largest among them during time slot t2 721, and the output 700 of the PD1 is the largest among them during time slots t3 722 and t4 723.

Hereinafter, such a phenomenon will be described in view of the receiver's decision. When one symbol duration is divided into a plurality of time slots, in a time interval when incoming signals greatly vary, output of a photodiode with a fast operation speed and a small area is more reliable. In contrast, in a time interval when no incoming signals vary, output of a photodiode with a large area is more reliable. That is, it is possible to discern a time interval required for fast operation speed characteristic of a photodiode with a small area and a time interval required for high SNR (Signal to Noise Ratio) characteristic of a photodiode with a large area within one symbol duration. For example, it is possible to anticipate that an initial time slot within one symbol duration has great variation of incoming signals.

Therefore, the gain controller 520 uses position information of time slot intervals within symbol durations and area information of corresponding photodiodes in a process of controlling gains. Therefore, the gain controller 520 allocates a larger gain value to a photodiode with a small area in a time slot interval required for fast operation speed characteristics of a photodiode with a small area, and allocates a larger gain value to a photodiode with a large area in a time slot interval required for high SNR characteristic of a photodiode with a large area, within symbol durations.

After calculating gain values of each of the photodiodes by the gain controller 520, the calculated gain values are multiplied by output values of corresponding photodiodes, which is performed by multipliers 510-1 to 510-n Then, output values of each of the photodiodes by which gain values have been multiplied are summed up by the summer 530. The summer 530 sums up the output values of each of the photodiodes to which the gain values have been applied according to each time slot interval, and then calculates all output values of the time slot interval. Then, the summer 530 sums up all output values of all time slot intervals constituting the symbol duration, and then calculates a final output value of the symbol duration. The finally-calculated output value is input to the demodulator 540 for demodulation, and then the resulting value is input to the decoder 550 for error correction.

Figure 6:
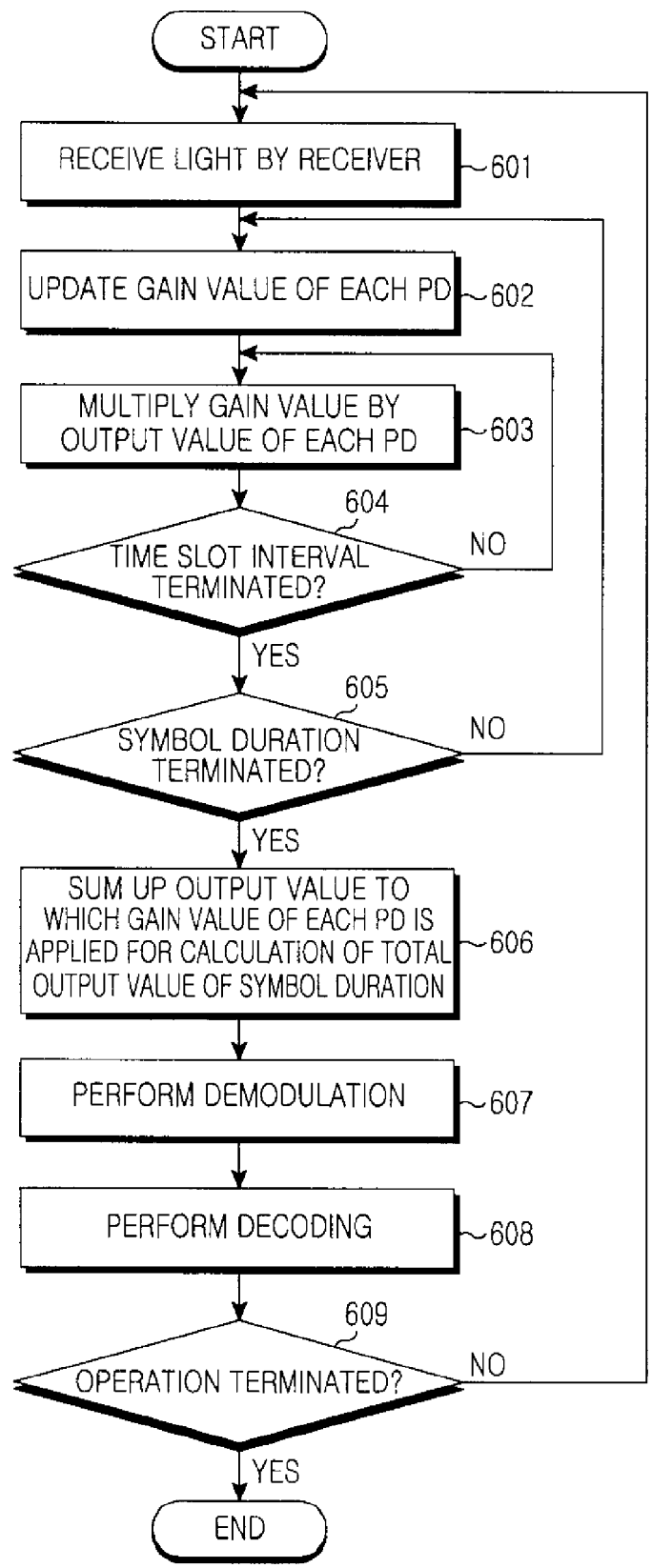
FIG. 6 is a flowchart illustrating a reception operation of visible light communication according to one embodiment of the present invention.

FIG. 6 is a flowchart illustrating a reception operation of visible light communication according to one embodiment of the present invention. Referring to FIG. 6, when the visible light communication receiver starts the reception operation, visible light signals are received at the photodiodes 500-1 to 500-n of the visible light communication receiver in step 601. In step 602, the gain controller 520 of the visible light communication receiver determines a gain value of each photodiode in consideration of the corresponding photodiode area in a current time slot and a current time slot position in the symbol duration. In step 603, the gain value determined in step 602 is multiplied by an output value of the corresponding photodiode.

In step 604, it is determined if the time slot interval is terminated. As a result of the determination in step 604, when the time slot interval is not terminated, the process returns to step 603, in which the gain values are multiplied by output values which is being output from each of the photodiodes. As a result of the determination in step 604, when the time slot interval is terminated, it is determined if the symbol duration is terminated in step 605. As a result of the determination in step 605, when the symbol duration is not terminated, the process returns to step 602, in which gain values of each of the photodiodes are updated in consideration of each photodiode area in a next time slot and a current time slot position in the symbol duration, and then steps 603 to 605 are repeatedly performed. As a result of the determination in step 605, when the symbol duration is terminated, all output values to which the gain values of all time slots constituting a corresponding symbol duration are applied are summed up, and then the total of the output value of the symbol duration is calculated in step 606.

In step 607, the output signal is demodulated. In step 608, decoding is performed. In step 609, it is determined if the operation is terminated. As a result of the determination in step 609, when the operation is not terminated, the process returns to step 601, in which the above-described steps are repeatedly performed. Otherwise, the operation is terminated.

According to the present invention as described above, when the visible light communication receiver receives visible light signals, the visible light communication receiver determines gain values of each of the photo-detectors in consideration of each photodiode area according to each of preset time slots in the photo-detector array, thereby decreasing Tailing interference between symbols, and improving reliability of incoming signals through a more accurate restoration process of incoming signals. Further, it is possible to continuously update gain values of photo-detectors according to each of a preset time slot in order to restore incoming signals, so that it is possible to perform a more accurate restoration process. Furthermore, it is possible to implement an effect capable of obtaining strong output signals together with fast reaction speed, by using an array including photo-detectors having a plurality of different areas.

According to the present invention, when a visible light communication receiver receives visible light signals, it is possible to determine a gain value of each of the photo-detectors in consideration of operation characteristics based on each photo-detector area for each of a plurality of preset time slots in a photo-detector array including photo-detectors having a plurality of different areas, so that a process of more accurately restoring incoming signals can be performed. Further, it is possible to perform restoration with reliability, as compared with the prior art, because gain values of photo-detectors are continuously updated according to each of the preset time slots for restoration of incoming signals. Furthermore, it is possible to use an array including a plurality of photo-detectors having a plurality of different areas, thereby implementing effects including strong output signals, and fast reaction speed, at the same time.

Constructions and operations of a method and an apparatus for determining a gain value of a photo-detector can be implemented in a visible light communication system according to an exemplary embodiment of the present invention. While the present invention has been shown and described with reference to certain exemplary embodiments thereof, it will be understood by those skilled in the art that various changes in form and details may be made therein without departing from the spirit and scope of the invention as defined by the appended claims.

What is claimed is:
1. A method for processing incoming signals of a plurality of photo-detectors in a visible light communication system, the method comprising the steps of:
   dividing a symbol duration to achieve a divided duration, said division being done according to an equal time interval to set the divided duration to a plurality of sequential time slots, the symbol duration being a time required to transmit one of a symbol and a bit;

receiving in a receiver a plurality of visible light signals through a photo-detector array comprising said plurality of photo-detectors;

determining a gain value of each photodiode of said plurality of photo-detectors during a time slot of a symbol duration, in consideration of an area of each photo-detector on the photo-detector array during the time slot and the time slot position within the symbol duration;

multiplying a gain value of each photo-detector of said plurality of photo-detectors by an output value of a corresponding photo-detector; and summing up output values of each of the photo-detectors by which the gain value has been multiplied and calculating a total of output values of the time slot.

2. The method as claimed in claim 1, wherein said plurality of photo-detectors is a plurality of photodiodes.

3. The method as claimed in claim 1, further comprising a step of summing up all output values of each of the time slots constituting the symbol duration and calculating a total output value of the symbol duration.

4. The method as claimed in claim 3, wherein said plurality of photo-detectors is a plurality of photodiodes.

5. The method as claimed in claim 1, wherein the photo-detector array includes a plurality of photo-detectors having a plurality of different areas, which are arranged in a plane, and each photo-detector of said plurality independently operates.

6. The method as claimed in claim 5, wherein said plurality of photo-detectors is a plurality of photodiodes.

7. The method as claimed in claim 1, wherein, in determining the gain value, a gain value larger than that of a photo-detector having a larger area is allocated to a photo-detector having a smaller area in a time slot expected to have greater variation of incoming signals than other time slots of the symbol duration, and a gain value larger than that of a photo-detector having a smaller area is allocated to a photo-detector having a larger area in a time slot expected to have no variation of incoming signals.

8. The method as claimed in claim 7, wherein said plurality of photo-detectors is a plurality of photodiodes.

9. A receiving apparatus for processing incoming signals of a plurality of photo-detectors in a visible light communication system, comprising:

a photo-detector array comprising the plurality of photo-detectors for converting received optical signals into electrical signals;

a gain controller for dividing symbol duration into a plurality of divided durations according to an equal time interval to set the divided durations to a plurality of time slots, the symbol duration being a time required to transmit one of a symbol and a bit, and for determining a gain value of each of the photo-detectors during the time slot in consideration of each photo-detector area on the photo-detector array during the time slot and a time slot position within the symbol duration;

a multiplier for multiplying the gain value determined in the gain controller by an output value of the corresponding photo-detector; and a summer for summing up an output value of each of the photo-detectors by which the gain value has been multiplied and calculating a total of output values of the time slot.

10. The apparatus as claimed in claim 9, wherein said plurality of photo-detectors is a plurality of photodiodes.

11. The apparatus as claimed in claim 9, wherein the summer sums up the total of output values of each of the time slots constituting the symbol duration and calculates a total output value of the symbol duration.

12. The apparatus as claimed in claim 11, wherein said plurality of photo-detectors is a plurality of photodiodes.

13. The apparatus as claimed in claim 9, wherein the photo-detector array includes a plurality of photo-detectors having a plurality of different areas, which are arranged in a plane, and each of the photo-detectors independently operates.

14. The apparatus as claimed in claim 13, wherein said plurality of photo-detectors is a plurality of photodiodes.

15. The apparatus as claimed in claim 9, wherein the gain controller allocates a gain value larger than that of a photodiode having a larger area to a photodiode having a smaller area in a time slot expected to have a greater variation of incoming signals than other time slots within the symbol duration, and the gain controller allocates a gain value larger than that of a photodiode having a smaller area to a photo-detector having a larger area in a time slot expected to have no variation of incoming signals.

16. The method as claimed in claim 15, wherein said plurality of photo-detectors is a plurality of photodiodes.

* * * * *